United States Patent
Krishnamurthy Sagar et al.

(10) Patent No.: US 9,992,423 B2
(45) Date of Patent: Jun. 5, 2018

(54) CONSTANT FIELD OF VIEW FOR IMAGE CAPTURE

(71) Applicant: QUALCOMM Incorporated, San Diego, CA (US)

(72) Inventors: Sanket Krishnamurthy Sagar, San Diego, CA (US); Venkata Ravi Kiran Dayana, San Diego, CA (US); Leung Chun Chan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/882,746

(22) Filed: Oct. 14, 2015

(65) Prior Publication Data
US 2017/0111588 A1    Apr. 20, 2017

(51) Int. Cl.
*H04N 5/232* (2006.01)
*H04N 5/262* (2006.01)

(52) U.S. Cl.
CPC ..... *H04N 5/23296* (2013.01); *H04N 5/23212* (2013.01); *H04N 5/23293* (2013.01); *H04N 5/2628* (2013.01)

(58) Field of Classification Search
CPC .......... H04N 5/23296; H04N 5/23293; H04N 5/23212; H04N 5/2628
USPC .......................................... 348/240.1, 240.2
See application file for complete search history.

(56) References Cited

U.S. PATENT DOCUMENTS

| | | | |
|---|---|---|---|
| 6,130,705 A | 10/2000 | Lareau et al. | |
| 8,922,665 B2 | 12/2014 | Cooper et al. | |
| 2001/0040630 A1* | 11/2001 | Matsuzaka | H04N 5/232 348/240.99 |
| 2005/0219642 A1 | 10/2005 | Yachida et al. | |
| 2010/0007784 A1* | 1/2010 | Haneda | H04N 5/23296 348/347 |
| 2013/0188045 A1 | 7/2013 | Kalevo | |
| 2013/0229547 A1 | 9/2013 | Takegawa | |

FOREIGN PATENT DOCUMENTS

| | | | | |
|---|---|---|---|---|
| JP | 2008160622 A | * | 7/2008 | ............ H04N 5/228 |
| WO | WO 2012073779 A1 | * | 6/2012 | ........... G02B 13/009 |

OTHER PUBLICATIONS

THEIA Technologies, "How to Calculate Image Resolution," 2009, pp. 1-9.
International Search Report and Written Opinion—PCT/US2016/048450—ISA/EPO—Nov. 21, 2016.

* cited by examiner

*Primary Examiner* — Nhan T Tran
(74) *Attorney, Agent, or Firm* — Austin Rapp

(57) ABSTRACT

Devices and methods for capturing images are described herein. A processor may be configured to capture a first image. The processor may further be configured to determine a distance between a lens and an image sensor of the image capture device for capturing the first image. The processor may further be configured to determine a portion of the image sensor to use for the first image based on the determined distance in order to maintain a constant field of view for one or more images captured by the image capture device. The processor may further be configured to adjust the portion of the image sensor used for the first image based on the determined portion of the image sensor to generate an adjusted first image.

26 Claims, 10 Drawing Sheets

CONSTANT FIELD OF VIEW FOR IMAGE CAPTURE

FIELD OF THE DISCLOSURE

This disclosure relates to camera imaging techniques. In particular, this disclosure relates to maintaining a constant field of view (FOV) for images captured using an image capture device during movement of a lens of the image capture device.

BACKGROUND

Many different types of image capture devices (e.g., smartphone with a camera, standalone digital camera, webcam, video camera, laptop with a camera, other devices with cameras, etc.) are used to capture images (e.g., still images, video images, etc.). These image capture devices may include an optical lens configured to move with respect to an image sensor. The image to be captured may be focused by the lens onto the image sensor, which detects and conveys the image information to other components of the camera for capture and storage of the image.

For example, a user of a smartphone may point a camera of the smartphone at a scene that the user wishes to take a picture and be able to view a preview of the scene on a screen of the smartphone that shows what the camera is capturing. The smartphone may be configured to perform a manual or auto focus of the camera, which moves the optical lens of the camera with respect to the image sensor to ensure the scene is in focus and not blurry. Such a change in position of the optical lens of the camera with respect to the image sensor may change the field of view of the image of the scene captured by the image sensor between the old position of the lens and the new position of the lens. Such a change in the field of view may be unexpected and cause the user to take a picture of a scene that is different than the scene the user initially intended to take a picture of or cause an unintended change in view of the preview on the screen of the smartphone.

SUMMARY

One aspect of the teachings of the disclosure relates to a method for capturing images. The method comprises capturing a first image with an image capture device. The method further comprises determining a distance between a lens and an image sensor of the image capture device for capturing the first image. The method further comprises determining a portion of the image sensor to use for the first image based on the determined distance in order to maintain a constant field of view for one or more images captured by the image capture device. The method further comprises adjusting the portion of the image sensor used for the first image based on the determined portion of the image sensor to generate an adjusted first image.

Another aspect of the teachings of the disclosure relates to an image capture device comprising a memory and a processor. The processor is configured to capture a first image. The processor is further configured to determine a distance between a lens and an image sensor of the image capture device for capturing the first image. The processor is further configured to determine a portion of the image sensor to use for the first image based on the determined distance in order to maintain a constant field of view for one or more images captured by the image capture device. The processor is further configured to adjust the portion of the image sensor used for the first image based on the determined portion of the image sensor to generate an adjusted first image.

A further aspect of the teachings of the disclosure relates to an image capture device. The image capture device comprises means for capturing a first image. The image capture device further comprises means for determining a distance between a lens and an image sensor of the image capture device for capturing the first image. The image capture device further comprises means for determining a portion of the image sensor to use for the first image based on the determined distance in order to maintain a constant field of view for one or more images captured by the image capture device. The image capture device further comprises means for adjusting the portion of the image sensor used for the first image based on the determined portion of the image sensor to generate an adjusted first image.

Another aspect of the teachings of the disclosure relates to a non-transitory computer readable medium having stored thereon instructions that, when executed, cause a processor of an image capture device to perform a method for capturing images. The method comprises capturing a first image with an image capture device. The method further comprises determining a distance between a lens and an image sensor of the image capture device for capturing the first image. The method further comprises determining a portion of the image sensor to use for the first image based on the determined distance in order to maintain a constant field of view for one or more images captured by the image capture device. The method further comprises adjusting the portion of the image sensor used for the first image based on the determined portion of the image sensor to generate an adjusted first image.

DETAILED DESCRIPTION

Figure 1A:
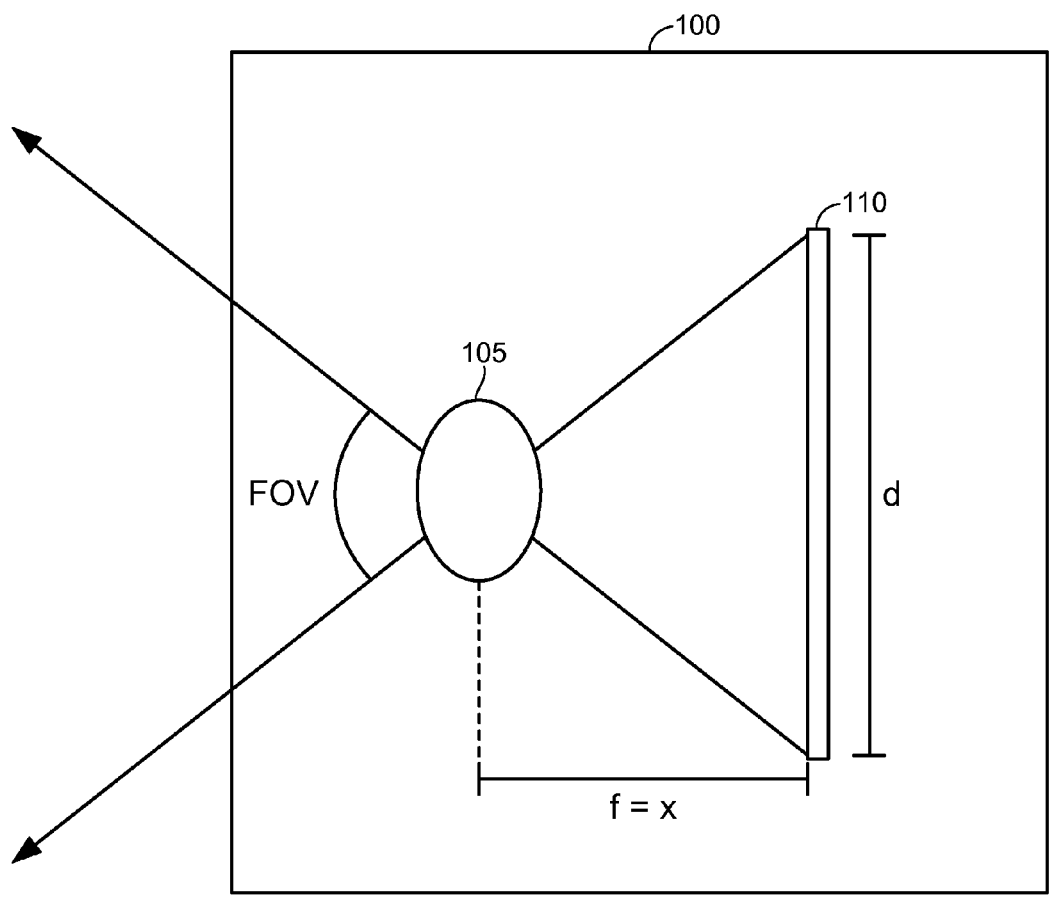
FIG. 1A visually illustrates the field of view of an image captured by an image sensor at a given distance between the image sensor and a lens.

Devices and methods of this disclosure relate to maintaining a constant field of view for images captured by an image capture device when the optical lens of the image capture device is in different positions. The image capture device may be a smartphone with a camera, standalone digital camera, webcam, video camera, laptop with a camera, other devices with cameras, or any other suitable device. In particular, devices and methods of this disclosure relate to maintaining a constant field of view for the image captured when the focal length (i.e., distance between the optical lens and an image sensor (e.g., charge-coupled device (CCD), complementary metal-oxide semiconductor (CMOS), etc.)) of the image capture device changes. Such image capture devices may also be referred to generally as a type of "camera device".

Some embodiments relate to an image capture device configured to crop the portion (e.g., resolution, height and width, etc.) of an image sensor used to capture an image or a portion of an image captured using the image sensor based on the position of an optical lens of the image capture device relative to the image sensor, so as to maintain a constant field of view regardless of the position of the optical lens.

It should be noted that "capture" as used herein, such as with respect to "capturing" an image, does not mean that the image is recorded or stored (e.g., on the image capture device). Rather, to "capture" an image simply refers to the image being obtained by the image capture device (e.g., and further processed, displayed, etc.), and such an image may or may not be further stored or recorded. In addition, some embodiments may refer to "the portion of an image sensor used to capture an image." In such embodiments, this may refer to either only utilizing a portion of the image sensor to capture an image, or only utilizing a portion of a full resolution image captured by the image sensor.

Further, it should be noted that "maintaining a constant field of view" as discussed herein, refers to maintaining a substantially constant field of view, and that the field of view is not necessarily held perfectly constant. This may be due, for example, to certain design constraints when designing an actual image capture device according to the principles of this disclosure.

The field of view is the angle of the visible field captured by the image capture device. The field of view of an image sensor is determined by the focal length of the lens (i.e., distance between the lens and the image sensor), aperture, and the size of the image sensor capture area. As shown, the field of view (FOV) for lenses projecting rectilinear images of distant objects can approximately be calculated according to the following formula:

$$FOV=2*\arctan(d/(2*f)) \quad (1)$$

wherein,

FOV=field of view;

d=the utilized portion (e.g., utilized size (e.g., height or width)) of the image sensor; and f=the focal length of the lens.

It should be noted that formula (1) can be used to calculate both horizontal and vertical field of view by applying the horizontal (e.g., height) or vertical (e.g., width) dimension of the image sensor, respectively. It should also be noted that formula (1) may be an estimation. For example, the formula does not take into account aperture size. The field of view may be larger for a larger aperture size, and smaller for a smaller aperture size. Therefore, in some embodiments described herein, the portion (e.g., resolution, height and width, etc.) of an image sensor used to capture an image is based on more than just the position of an optical lens of the image capture device relative to the image sensor, but also based on any other pertinent variable that can change in a given image capture device for calculating field of view, such as aperture.

As can be seen from the formula, if the image sensor size d is constant, and f decreases, the field of view increases. Further, if the image sensor size d is constant, and f increases, the field of view decreases.

Figure 1B:
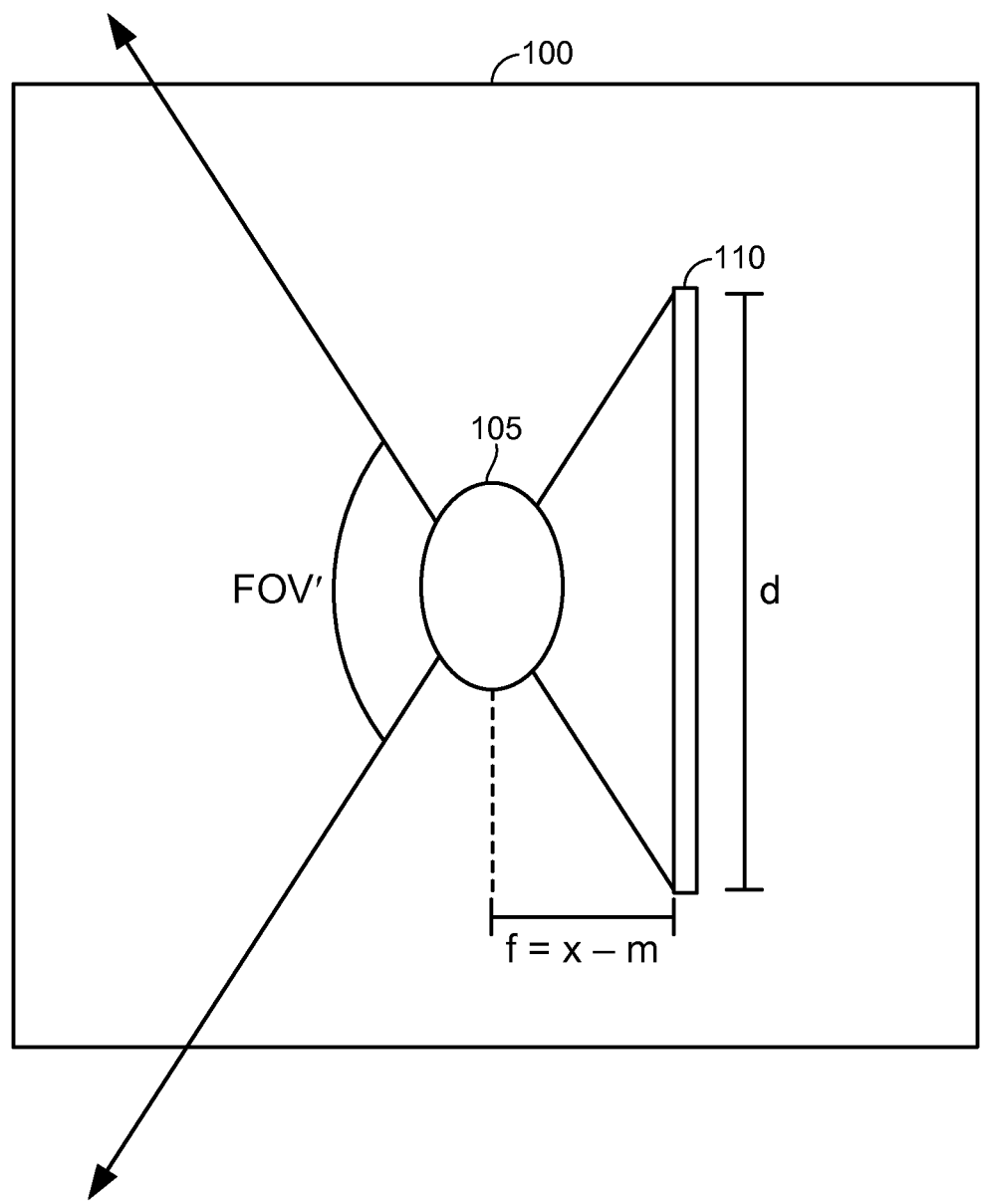
FIG. 1B visually illustrates the field of view of an image captured by an image sensor at a distance between the image sensor and a lens that is less than the distance shown in FIG. 1A.

FIGS. 1A and 1B visually illustrate how the position of a lens 105 of an image capture device 100 with respect to an image sensor 110 may affect the field of view FOV of the image captured by the image sensor 110. FIG. 1A shows the field of view FOV of the image captured by the image sensor 110 where the distance f is a value x. FIG. 1B shows the field of view FOV' of the image captured by the image sensor 110 where the distance f is x−m (i.e., less than the distance f=x as shown in FIG. 1A). As shown, the image sensor size d (depicted in one dimension for ease of understanding) of image sensor 110 remains constant between FIGS. 1A and 1B. As can be seen, the field of view FOV increases between FIGS. 1A and 1B due to the decrease in the distance f.

As stated above, devices and methods of this disclosure relate to maintaining a constant field of view for images captured by an image capture device when the lens of the image capture device is in different positions. Accordingly, to maintain the field of view FOV, while the distance f between the lens and the image sensor changes, the image sensor size d would change. Such a change in the physical image sensor size d may not be physically feasible in an image capture device. Therefore, some embodiments described herein relate to only using a portion (e.g., portion of the area, such as defined by less than the entire width and/or less then the entire height) of the image sensor to capture an image, wherein the portion of the image sensor used may be determined by the position of the lens relative to the image sensor (and, optionally, may also be based on other variables such as aperture, as described above). The portion of the image sensor used may be defined for both the horizontal and vertical directions. Further, the portion used may be defined in terms of resolution (e.g., pixels), size (e.g., mm), percentage (e.g., 80% of the sensor size), crop factor (e.g., crop 20% of the image sensor and use only 80%), etc. For example, the portion of the image sensor size used may be d in formula (1) and may be selected to maintain the field of view FOV at a constant value for different values of the distance f.

Figure 2A:
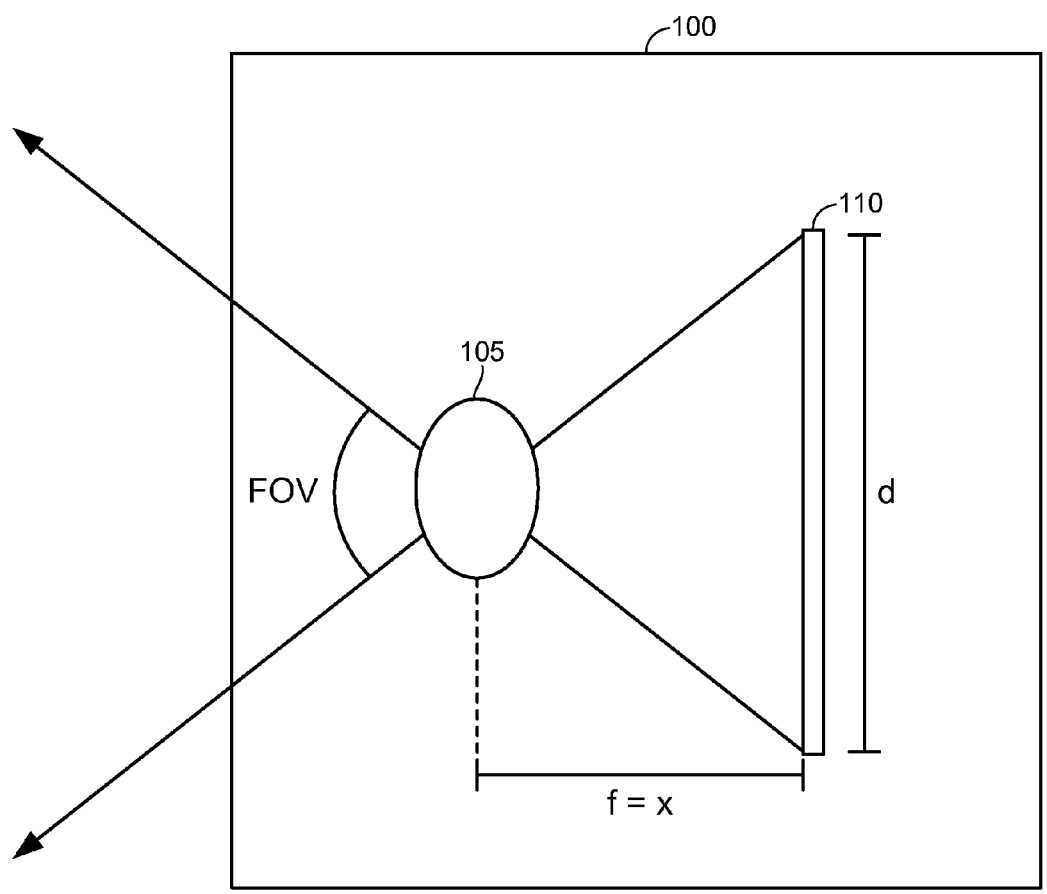
FIG. 2A visually illustrates the field of view of an image captured by an image sensor at a given distance between the image sensor and a lens when using the entire image sensor.
Figure 2B:
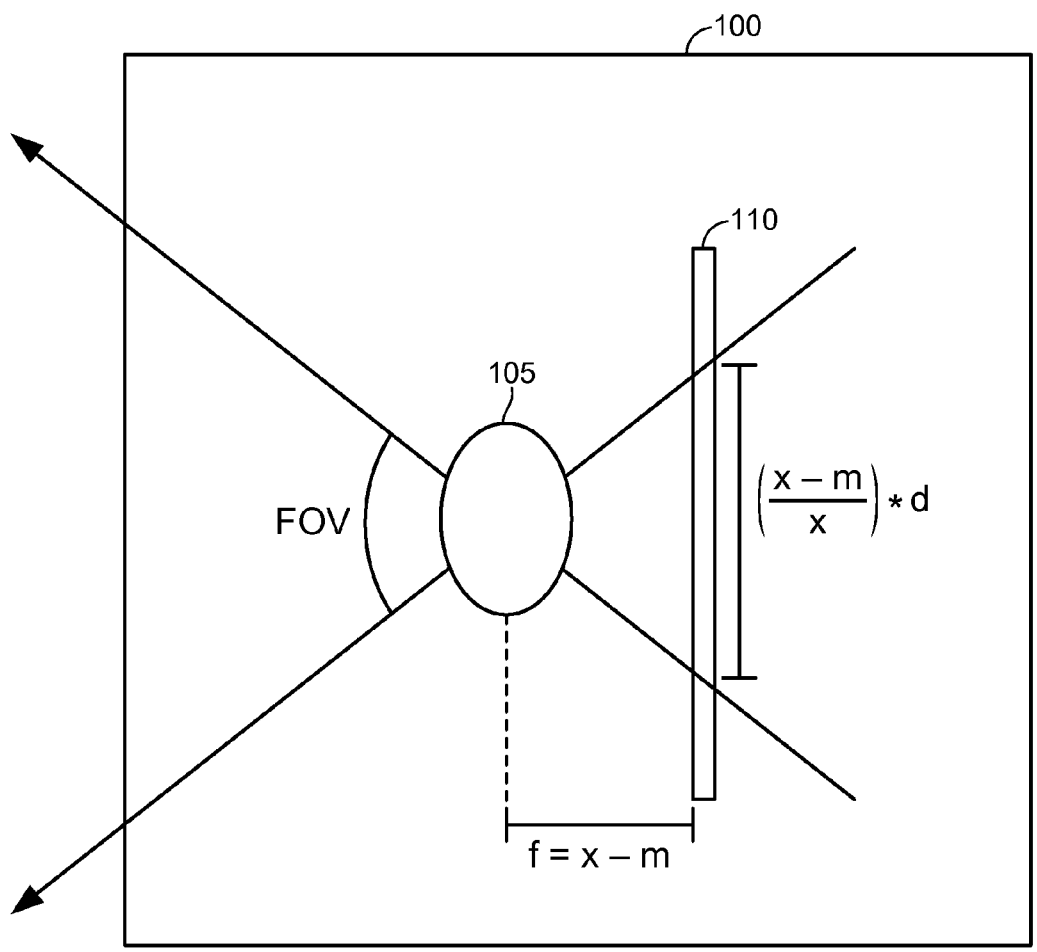
FIG. 2B visually illustrates the field of view of an image captured by an image sensor at a distance between the image sensor and a lens that is less than the distance shown in FIG. 2A when using less than the entire image sensor to maintain the same field of view as in FIG. 2A.

FIGS. 2A and 2B visually illustrate how the portion of an image sensor 110 used to capture an image based on the position of a lens 105 of an image capture device 100 with respect to the image sensor 110 can be selected to maintain a constant field of view of the image captured by the image sensor 110. As shown in FIG. 2A, where f=x, the entire size of the image sensor d may be used, making the field of view FOV=2*arctan(d/(2*x)). As shown in FIG. 2B, where f=x−m, the portion of the image sensor used is equal to ((x−m)/x)*d, maintaining the field of view FOV. Therefore, selecting the portion of the image sensor can maintain the same value of field of view FOV, even for different distances f. However, it should be noted that the resolution of the image may change when changing the portion of the image sensor used to capture the image in order to maintain the constant field of view FOV.

Maintaining constant field of view may be potentially beneficial in a number of scenarios when using an image capture device. For example, an autofocus operation implemented in an image capture device may cause the focal length d of the lens to change, and accordingly the field of view FOV to change if the entire image sensor is used to capture the image. Such an autofocus operation may occur while an image capture device displays a preview of an image of a scene before saving or recording the image, or may occur while a video (e.g., series of images) of the scene is being captured and saved or recorded by the image capture device. For example, if new objects enter the scene, or the image capture device is moved so as to capture an image of a different portion of the scene or a different scene, or even if the zoom used for capturing the scene changes, the focal point of the image capture device may change. Accordingly, the autofocus operation may change the focal length d of the lens, thus potentially changing the field of view FOV of the captured image.

By using the embodiments described herein, the image preview and/or video can maintain a constant field of view, even during such an autofocus operation or even a manual focus operation. This may provide for a better user experience for a user of the image capture device as it may avoid jittery changes in field of view FOV when previewing an image or recording a video. Thus, a preview or a recorded video may have a smoother, less jittery look during playback, as shifts in the field of view FOV may be reduced or eliminated. Further, a user may not have to constantly try and reframe the scene of an image to be captured or a video being recorded because the field of view FOV changed, thus causing a different portion of the scene to be captured. The captured image, accordingly, may be a more accurate depiction of what the user intended to capture.

Figure 3:
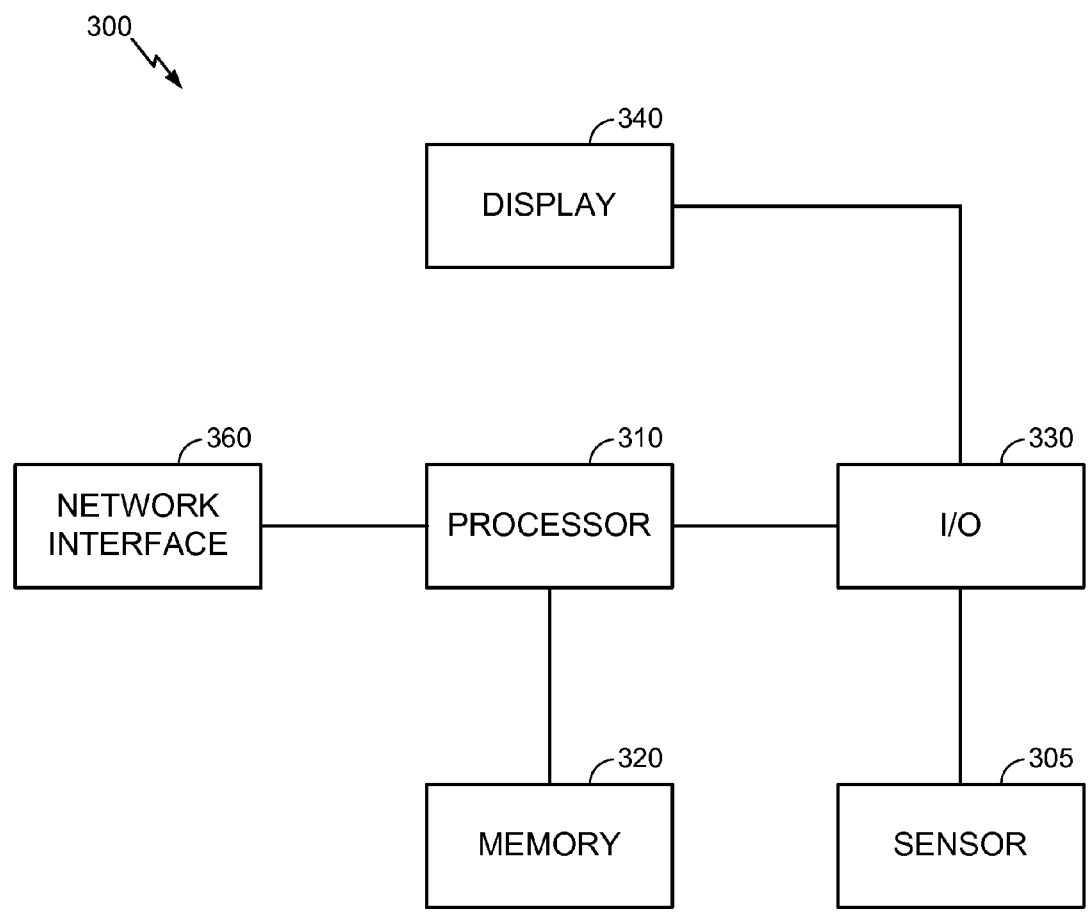
FIG. 3 is a functional block diagram of an example of an image capture device.

FIG. 3 is a functional block diagram of an image capture device 300. For example, the image capture device 300 may correspond to the image capture device 100 of FIGS. 1-2, or any other similar image capture device, including a smartphone, digital camera, etc. The image capture device 300 includes a processor 310 in data communication with a memory 320, and an input/output interface 330. The input/output interface 330 is further in data communication with a display 340 and a sensor 305 (e.g., charge-coupled device (CCD), complementary metal-oxide semiconductor (CMOS), etc.). In some embodiments, a lens may be integrated with the sensor 305 as part of a sensor module. In some other embodiments, the lens may be separately attached physically to the image capture device 300. The lens may be moveable, such as by controlling a servo, actuator, motor assembly, etc., configured to move the position of the lens relative to the sensor 305. Electronics (e.g., a controller, which may be a processor like processor 310) that control the lens may be in data communication with the processor 310. The processor 310 is further in data communication with a network interface 360. Although described separately, it is to be appreciated that functional blocks described with respect to the image capture device 300 need not be separate structural elements. For example, the processor 310 and memory 320 may be embodied in a single chip. Similarly, two or more of the processors 310, and network interface 360 may be embodied in a single chip. The image capture device 300 may be configured to perform the functions described herein. For example, the processor 310 may be configured to execute instructions stored in the memory 320 that cause the image capture device 300 to perform the functions described herein.

The processor 310 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 310 can be coupled, via one or more buses, to read information from or write information to memory 320. The processor may additionally, or in the alternative, contain memory, such as processor registers. The memory 320 can include processor cache, including a multi-level hierarchical cache in which different levels have different capacities and access speeds. The memory 320 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 310 is also coupled to an input/output interface 330 for, receiving input from and providing output to, devices connected to the image capture device 300. Examples of such devices include, but are not limited to, a keyboard, buttons, keys, switches, a pointing device, a mouse, a joystick, a remote control, an infrared detector, a camera sensor (e.g., sensor 305), a DVD player, a Blu-ray player, a motion detector, a microphone (possibly coupled to audio processing software to, e.g., detect voice commands) visual output devices such as a touch-screen display (e.g., display 340), including displays and printers, audio output devices, including speakers, headphones, earphones, and alarms, and haptic output devices, including force-feedback game controllers and vibrating devices. The input/output interface 330 may use one or more protocols to, wirelessly or through a wired connection, communicate with devices including but not limited to universal serial bus (USB), FireWire, Thunderbolt, Light Peak, digital video interface (DVI), high-definition multimedia interface (HDMI), video graphics array (VGA), peripheral component interconnect (PCI), etc.

The processor 310 is further coupled to a network interface 360. The network interface 360 may comprise one or more modems. The network interface 360 prepares data generated by the processor 310 for transmission to a network or another device. The network interface 360 may also demodulate data received via the network. The network interface 360 can include a transmitter, receiver, or both (e.g., a transceiver). In other embodiments, the transmitter and receiver are two separate components. The network interface 360, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The network interface 360 may be a wired interface (e.g., Ethernet, local area network (LAN), etc.) and/or a wireless interface (e.g., Long-Term Evolution (LTE), wireless local area network (WLAN), WiFi, code division multiple access (CDMA), global system for mobile communications (GSM), worldwide interoperability for microwave access (WiMax), Bluetooth, etc.).

It should be noted that image capture device 300 is just one example of an image capture device, and that in some embodiments, an image capture device may have fewer or additional components than those described with respect to image capture device 300. For example, in some embodiments, an image capture device 300 may not include the network interface 360.

Figure 4:
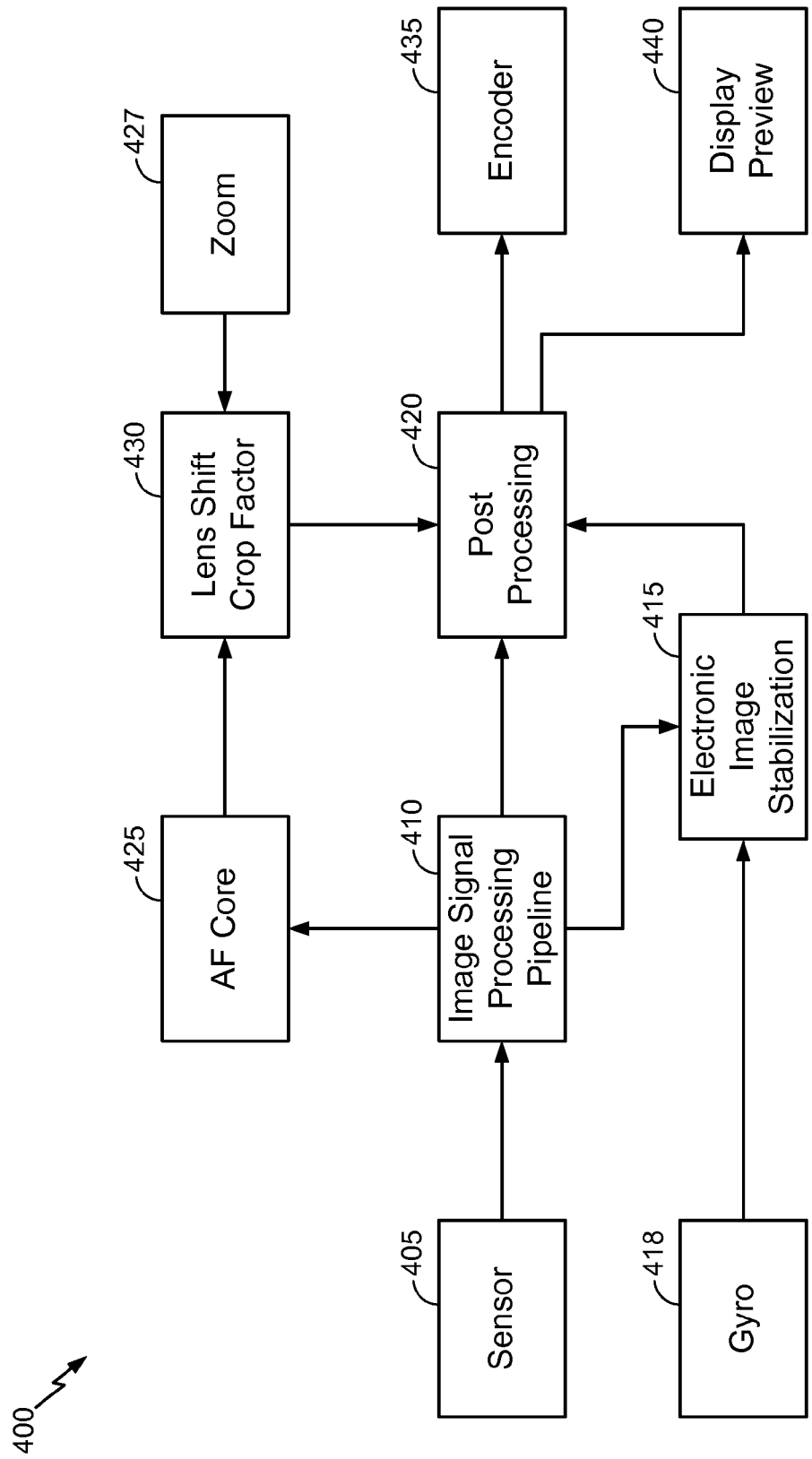
FIG. 4 is another functional block diagram of an example of an image capture device.

FIG. 4 is another functional block diagram of an image capture device 400. For example, the image capture device 400 may correspond to the image capture device 100 of FIGS. 1-2, or any other similar image capture device, including a smartphone, digital camera, etc. Further, the image capture device 400 may comprise an embodiment of the image capture device 300, wherein certain components, modules, and/or functions of the image capture device 400 correspond to certain components of the image capture device 300. For example, the image capture device 400 includes a sensor 405 that may correspond to the sensor 305 and a display 440 that may correspond to the display 340. Further, various other components or modules of the image capture device 400 may be processors like the processor 310, and/or the functions of various components or modules may be stored as instructions on a memory like the memory 320 and performed by one or more processors like the processor 310.

The sensor 405 may be configured to capture and pass (e.g., transmit, send, etc.) the full resolution image (e.g., the image taken by the full size of the sensor) to an image signal processing pipeline module 410. The image signal processing pipeline module 410 may be configured to take the full resolution image output of the sensor 405, process the full resolutions image, and store it in a buffer.

For example, the image signal processing pipeline module 410 may pass information (e.g., image statistics) about the full resolution image output to an electronic image stabilization module 415. The electronic image stabilization module 415 may be configured to determine an amount to shift the full resolution image, such as for video capture or preview of the image, based on previous images captured by the sensor 405 and pass information to counteract motion of the image capture device 400. The electronic image stabilization module 415 may further be configured to determine an amount to shift the full resolution image based on information about the movement of the image capture device 400 received from a gyro 418. The gyro 418 may be a physical gyro configured to detect movement (e.g., accelerometer, gyroscope, etc.). The electronic image stabilization module 415 may be configured to send such shift information (e.g., an amount to shift the image) and/or image cropping information (e.g., a portion (e.g., a height and width, resolution, etc.) of the image to use) related to the shift that is used to counteract motion to a post processing module 420. The post processing module 420 may be configured to utilize the shift information and/or image cropping information to actually modify the full resolution image.

Further, the image signal processing pipeline module 410 may be configured to send information (e.g., autofocus statistics) to an autofocus core module 425. The autofocus core module 425 may be configured to determine if the image captured by the sensor 405 is in focus, such as using known autofocus algorithms or techniques. The autofocus core module 425 may be configured to determine the correct lens position (e.g., distance from the sensor 405, such as between a minimum and maximum distance the autofocus core module 425 can change the position of the lens) to focus the image being captured and send such information to the lens shift crop factor module 430. The autofocus core module 425 may also be configured to use such information to control the position of the lens, such as by controlling an actuator, servo, motor assembly, etc. It should be noted, that in some embodiments, instead of an autofocus operation being performed, a similar manual focus may be performed by a user of the image capture device 400.

In some embodiments, the image capture device 400 includes a zoom module 427 that controls a level of digital and/or optical zoom used to capture the image. For example, the level of digital zoom may indicate a portion of the full resolution image captured by the image sensor 405 to use for previewing, storing or recording the image and an amount to digitally magnify that portion of the image. Further, the level of optical zoom may indicate how to control an actuator, servo, motor assembly, etc. to change a physical distance of the lens from the sensory 405 to cause a change in the zoom level of the image captured. The zoom module 427 may be configured to send such information (e.g., the portion of the full resolution image captured by the image sensor to use and/or the level of optical zoom used) regarding the digital zoom or optical zoom to the lens shift crop module 430.

The lens shift crop factor module 430 may be configured to determine an amount to crop the full resolution image (e.g., a portion of the output of the sensor 405 to use (e.g., a height and width or resolution of the captured image to use)). As discussed herein, the lens shift crop factor module 430 may be configured to determine the amount to crop (e.g., the portion of the image sensor 405 to use for capturing the image) based on the lens position of the lens relative to the sensor 405 to maintain a substantially constant field of view. Lens position information may be received from the autofocus core module 425. Lens position information may further be received from the zoom module 427, such as if optical zoom is used. For example, if optical zoom is used, the level of optical zoom information received from the zoom module 427 may indicate a relative (e.g., relative to the minimum lens distance the autofocus core module 425 can control the lens position) of distance that of the lens to the sensor 405 based on the optical zoom performed. In such cases, the lens position of the lens used by the lens shift crop factor module 430 may be based on a sum of the information received from the autofocus core module 425 and the zoom module 427.

In some embodiments, the lens shift crop factor module 430 may be configured to determine the amount to crop based on the information regarding digital zoom received from the zoom module 427 in addition to the lens position of the lens relative to the sensor 405 to maintain a substantially constant field of view. For example, the information regarding digital zoom may indicate a further portion of the full resolution image to crop based on the digital zoom operation performed.

The lens shift crop factor module 430 may send the information regarding the amount to crop the full resolution image to the post processing module 420. As described above, in various embodiments the lens shift crop factor module 430 may send information regarding the amount to crop (e.g., portion of the image sensor 405 to use for capturing an image). For example, the lens shift crop factor may send information regarding a vertical and horizontal: resolution (e.g., pixels), size (e.g., mm), percentage (e.g., 80% of the full resolution image), crop factor (e.g., crop 20% of the full resolution image and use only 80%), etc. of the full resolution image to use.

The post processing module 420 may be configured to receive the full resolution image from the image signal processing pipeline module 410, the information regarding shift information and/or image cropping information due to image capture device movement from the electronic image stabilization module 415, and the information regarding the amount to crop the full resolution image to maintain field of view from the lens shift crop factor module 430. The post processing module 420 may utilize this information to process the full resolution image, including cropping (e.g., using a portion of) the full resolution image to maintain field of view. The post processing module 420 may send the cropped image to an encoder module 435, which may be configured to encode the image for storage and/or transmission to another device (e.g., as a taken single still picture and/or video comprising a series of images). Further, the post processing module 420 may send the cropped image to the display 440 to allow the image to be previewed by a user, such as when the image capture device 400 is in a preview mode. In some embodiments, in addition to or alternative to encoding the cropped image for storage and/or transmission to another device, the post processing module 420 may send the full resolution image to the encoder module 435 for storage and/or transmission to another device. For example, both the cropped image and the full resolution image may be stored and/or transmitted so as to provide a choice as to which image is preferable for a particular situation. Further, as another example, the cropped image may be sent to the display 440 to allow the image previewed in a preview mode to maintain a constant field of view, however, the full resolution image may be sent to the encoder module 435 to allow a larger, higher resolution image to be later viewed. In some such embodiments, this provides the advantage of maintaining a constant field of view for image preview, while still only storing a single image to save on storage usage.

In some embodiments, the preview image on the display 440, may correspond to the cropped image before or as it (and/or the full resolution image) is encoded and stored by the image capture device 400. For example, the preview image may be of the current image of a video being captured by the sensor 405, and displayed as part of a user interface (UI) on the display 440. In another example, the preview image may be of the current image being captured by the sensor 405 as a user is attempting to take a picture. An input may be received by the image capture device 400 to then store the image, which may be encoded and stored and/or transmitted. The use of the information regarding the amount to crop the full resolution image by the post processing module 420 may ensure that the field of view of the preview image and/or video captured does not change for a given scene.

For example, the image capture device 400 may capture a particular scene, for example as the user prepares to take a picture or take a video with the image capture device 400. The image capture device 400 may capture the scene as a plurality of images at a particular rate (e.g., frame rate), and store the plurality of images and/or update the scene on the display 440 according to the most recently captured image (e.g., in approximately real-time). Further, an autofocus function (or similarly a manual focus function) may cause the position of the lens to change between each of the plurality of images, as described herein, such as if the image capture device 400 focuses on different objects in the scene or new objects enter the scene that change the focal point of the scene, requiring a different focal length. This change in lens position may be used by the lens shift crop factor module 430 and post processing module 420 to determine the portion of the information from the sensor 405 to use for display (e.g., as part of a preview mode) and/or store as part of a video or single image each of the plurality of images in order to maintain the field of view between the plurality of images.

Further, described herein are some examples where the image capture device 400 displays the cropped image on a display of the image capture device 400 in a preview mode. For example, the preview mode may be used to preview on the display the image currently being captured by the image sensor, such as when a video is being recorded and/or before an image is stored or recorded. The preview mode may be built into a user interface (UI) of, for example, a dedicated image capture device, such as a dedicated camera, dedicated video camera, etc. Further, the preview mode may be part of a UI of an image capture application (photo application, video capture application, etc.) running on the image capture device 400 (e.g., where the device is a smartphone, tablet, computing device, etc.). The user of the image capture device 400 may utilize the preview mode to view as a preview a picture to take or video to record on the display of the image capture device 400. This may allow the user to ensure the desired scene is captured. Accordingly, by using the techniques herein to maintain a constant field of view during the preview mode, a display of the image to the user may have a smoother, less jittery look during playback, as shifts in the field of view FOV may be reduced or eliminated. Further, a user may not have to constantly try and reframe the scene of an image to be captured or a video being recorded because the field of view FOV changed, thus causing a different portion of the scene to be captured.

In some embodiments, the determination of the portion of the sensor 405 to use to maintain the field of view may be based on a formula (such as formula (1)) and determined by the lens shift crop factor module 430 based on the distance between the lens and the sensor 405 (and optionally other factors). In some other embodiments, the portion of the sensor 405 to use may be determined from a table correlating lens position to the portion of the sensor 405 to use. Such a table may be stored in a memory (e.g., the memory 320) of the image capture device 400, and derived based on initial testing of the image capture device and/or a formula such as formula (1).

For example, the movement of the lens may be physically limited by the design of the image capture device 400. Accordingly, the range of distances for the lens, including a minimum distance from the sensor 405 and a maximum distance from the sensor 405 may be determined for the image capture device 400. Using the entire portion of the sensor 405 for images captured with the smallest physically possible field of view (i.e., maximum lens distance from the sensor 405) of the image capture device 400 may ensure that the field of view can be maintained for all lens positions. This is because the field of view can be decreased by using less than the entire sensor for lens positions closer to the sensor, but cannot be increased by using more than the entire sensor for lens positions farther from the sensor. Accordingly, the use of the entire sensor (e.g., no cropping) may be set as the baseline portion of the sensor to use (e.g., no cropping) at the maximum distance of the lens from the sensor 405. The cropping factor or portion of the sensor 405 used at the remaining distances of the lens from the sensor 405 may be then be calculated based on this information (e.g., maximum lens distance) and additional information (e.g., FOV, f, etc.), such as using the formula (1).

In some embodiments, the image capture device 400 may support a digital zoom feature. According to a digital zoom feature, only a portion of the sensor may be used to capture an image based on the digital zoom level selected. The range of distances for the lens, including a minimum distance from the sensor 405 and a maximum distance from the sensor 405 may remain the same at any given digital zoom level, and may be determined for the image capture device 400. Accordingly, the maximum portion of the sensor 405 used for capturing images at a particular digital zoom level (e.g., cropped based on the digital zoom level, but not cropped at all based on lens position) may be set as the baseline portion of the sensor 405 used at the maximum distance of the lens from the sensor 405. The cropping factor or portion of the sensor 405 used at the remaining distances of the lens from the sensor 405 at the given digital zoom level may be then calculated based on this information, such as using the formula (1). Accordingly, a set of cropping factors for lens positions due to autofocus (or manual focus) operations may be calculated for each digital zoom position of the image capture device 400.

In some embodiments, the image capture device 400 may have an optical zoom lens that also has an autofocus (or manual focus) ability. In such cases the position of the lens with respect to the sensor may change dramatically based on a user selected optical zoom position, meaning there is a relatively large range of positions for the lens relative to focusing positions at a particular zoom position. Using the maximum position of the lens from the sensor and the minimum position of the lens of the sensor based on the entire optical zoom range of the lens may not be desirable as it may adversely affect image quality and eliminate the purpose of zoom (which inherently changes field of view). However, once the user has selected an optical zoom position, at the particular optical zoom position of the lens, the range of distances for the lens, including a minimum distance from the sensor 405 and a maximum distance from the sensor 405 based on any autofocus (or manual focus) performed, may be determined. Accordingly, a set of cropping factors for lens positions due to autofocus (or manual focus) operations may be calculated for each optical zoom position of the lens of the image capture device 400, such as using the techniques described with respect to non-zoom lenses.

It should be noted, that such optical zoom lenses can also be used in conjunction with digital zooms. Accordingly, a set of cropping factors for lens positions due to autofocus (or manual focus) operations may be calculated for each digital zoom position of the image capture device 400 at each optical zoom position. Alternatively, a set of cropping factors for lens positions due to autofocus (or manual focus) operations may be calculated for each digital zoom position of the image capture device 400 at only the maximum optical zoom position.

Figure 5:
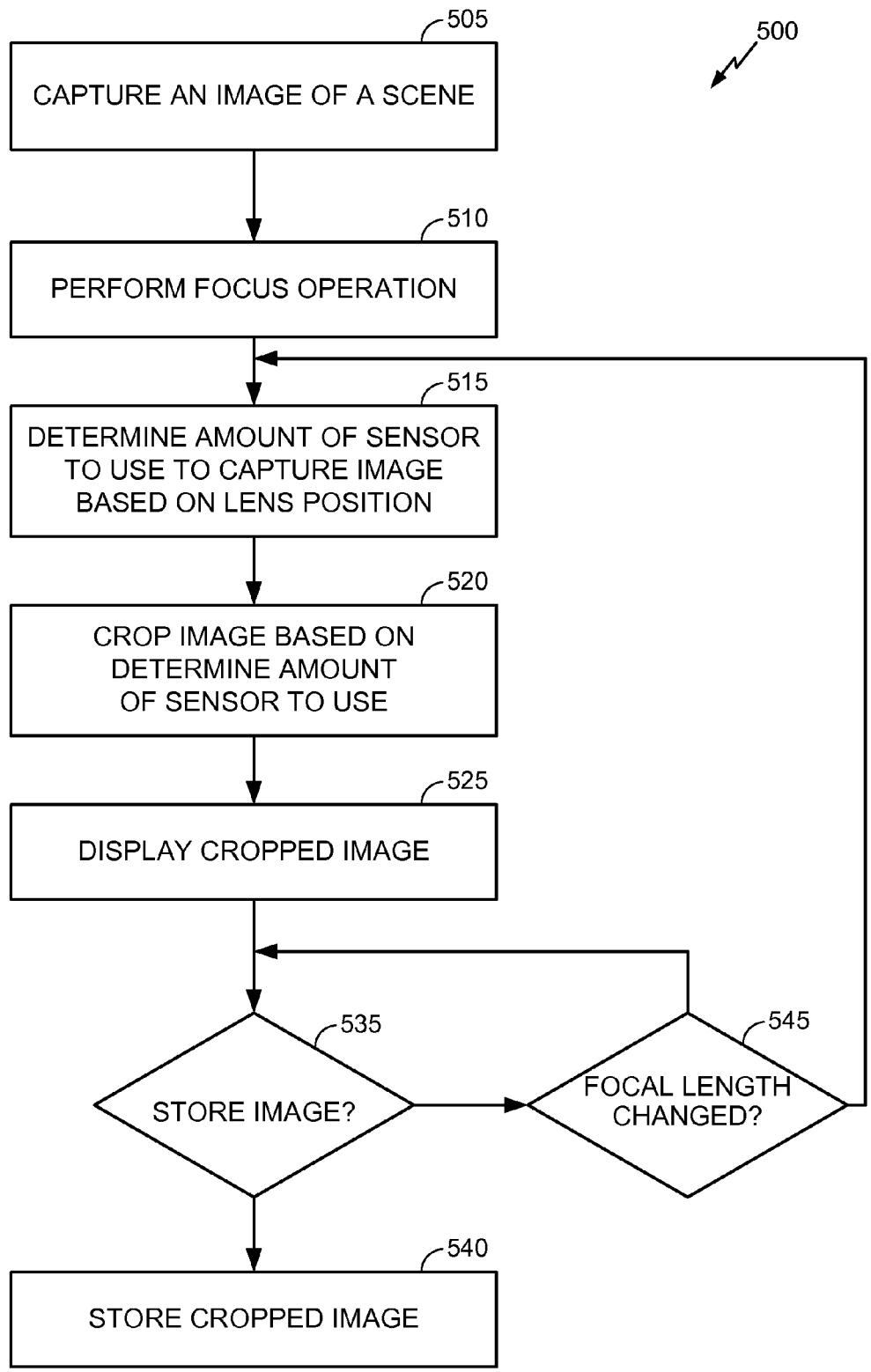
FIG. 5 is a flowchart of a process for maintaining a constant field of view for a preview of a scene being captured by an image capture device.

FIG. 5 is a flowchart of a process 500 for maintaining a constant field of view for a preview of a scene being captured by an image capture device. At a block 505, an image capture device begins capturing an image of a scene to take a picture of the scene. Continuing, at a block 510, a focus operation (e.g., autofocus or manual focus) may be performed by the image capture device to focus on one or more objects in the scene. The focus operation may cause a lens of the image capture device to shift or move to a certain distance from an image sensor of the image capture device.

Further, at a block 515, the image capture device may determine a portion of the image sensor to use for storing one or more images and/or displaying a preview of the scene on a display of the image capture device based on the distance of the lens from the image sensor to maintain a constant field of view of the scene. For example, the image capture device may calculate the portion of the image sensor to use based on a formula, such as formula (1). Alternatively, the image capture device may use a look up table stored in a memory of the image capture device to look up the portion of the image sensor to use based on the distance of the lens from the image sensor. In particular, the look up table may comprise a database of distances between the lens and the image sensor and corresponding portions of the image sensor to use.

Continuing, at a block 520, the image capture device may crop the full resolution image being captured by the image sensor according to the determined portion of the image sensor to use. At a block 525, the image capture device may display the cropped image on the display of the image capture device, for example, in a preview mode.

Further, at a block 535, it may be determined by the image capture device, if an input is received at the image capture device (e.g., on a UI or physical button of the image capture device), to store one or more images of the scene. If at the block 535, it is determined an input is received to store one or more images of the scene, the process continues to a block 540. At block 540, the image capture device may save and store the one or more cropped images and/or the full resolution images as the one or more images of the scene and the process 500 ends. For example, in some embodiments, the image capture device may store a full resolution image where only a single image is selected to save and store, so field of view does not need to be maintained between multiple images. In some embodiments, if multiple images are saved and stored, the cropped images may be saved and stored so as to maintain a constant field of view between the multiple images. Further, in some embodiments, the image capture device may store a cropped image for a single image that is saved and stored so it is the same image as previewed to the user.

If at the block 535, it is determined an input is not received to store one or more images of the scene, the process 500 continues to a block 545. At the block 545, it is determined by the image capture device if the focal length (i.e., position of the lens relative to the image sensor) has changed, such as if a new focus operation is performed (e.g., in embodiments where an autofocus operation is continuously performed by the image capture device as images are captured, or if a new focus operation is manually or automatically performed) that changes the focal length. If at the block 545 it is determined that the focal length has changed, the process 500 may proceed to the block 515. If at the block 545, it is determined by the image capture device that the focal length has not changed, the process 500 may proceed to the block 535.

It should be noted, that during the process 500, each of the cropped images from the block 520 may maintain a constant field of view due to the determination made at block 515. Accordingly, the display of images on the display of the image capture device, such as in a preview mode, may maintain a constant field of view. Further, images stored by the image capture devices (such as images of a video, sequence of pictures, etc.) may maintain a constant field of view.

Figure 6:
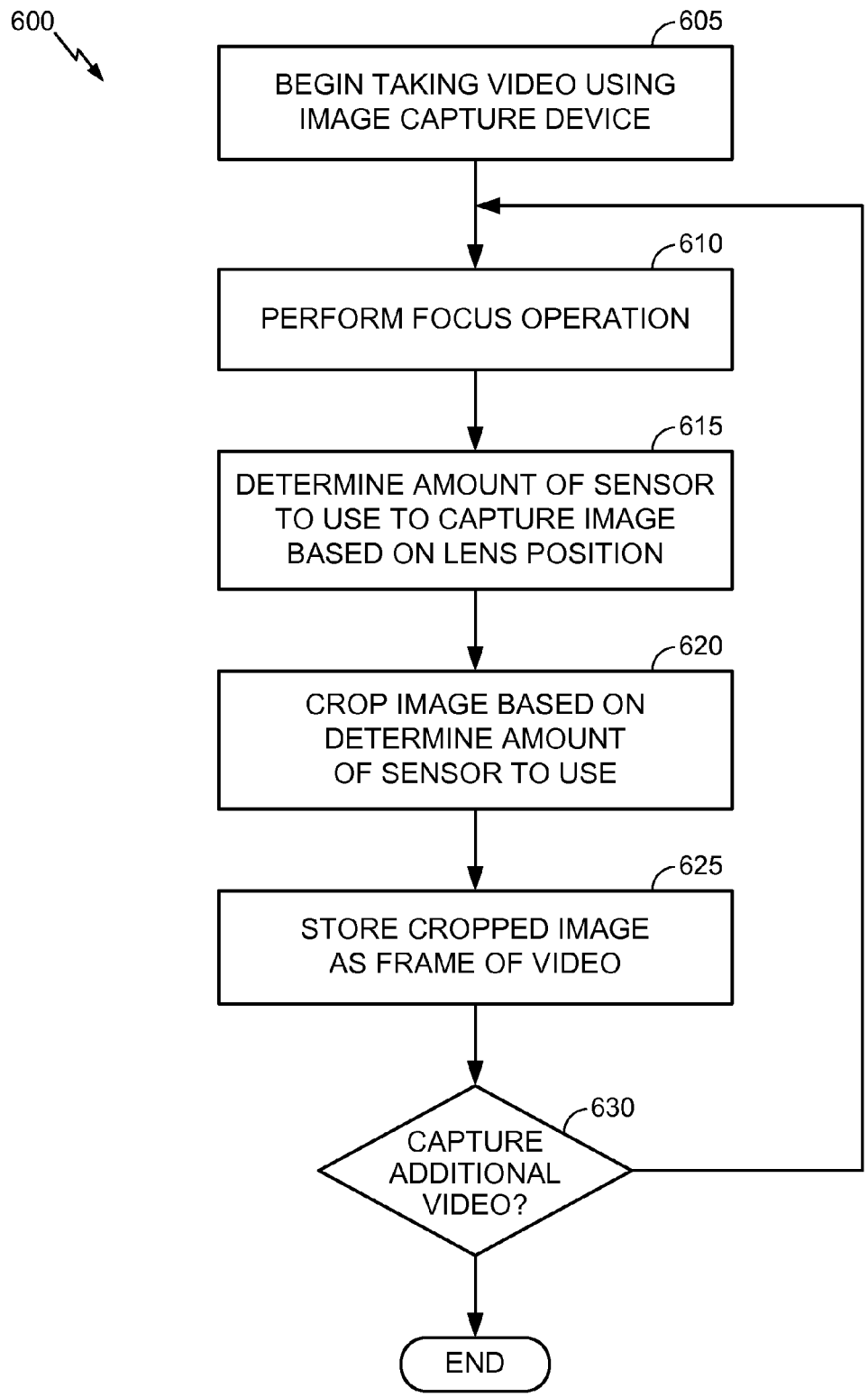
FIG. 6 is a flowchart of a process for maintaining a constant field of view for a video being captured by an image capture device.

FIG. 6 is a flowchart of a process 600 for maintaining a constant field of view for a video being captured by an image capture device. At a block 605, an input is received at an image capture device (e.g., on a UI or physical button of the image capture device) to take a video (comprising a series of frames of images) using the image capture device. Continuing, at a block 610, a focus operation (e.g., autofocus or manual focus) may be performed by the image capture device to focus on one or more objects of a current image being captured by an image sensor of the image capture device. The focus operation may cause a lens of the image capture device to shift or move to a certain distance from the image sensor.

Further, at a block 615, the image capture device may determine a portion of the image sensor to use for storing the current image as a frame of video based on the distance of the lens from the image sensor to maintain a constant field of view for the video. For example, the image capture device may calculate the portion of the image sensor to use based on a formula, such as formula (1). Alternatively, the image capture device may use a look up table stored in a memory of the image capture device to look up the portion of the image sensor to use based on the distance of the lens from the image sensor. In particular, the look up table may comprise a database of pairs of distances between the lens and the image sensor and corresponding portions of the image sensor to use.

Continuing, at a block 620, the image capture device may crop the full resolution image of the current image being captured by the image sensor according to the determined portion of the image sensor to use. Further, at a block 625, the cropped image of the current image may be stored as the next frame of the video.

At a block 630, it may be determined by the image capture device if additional frames of video are to be captured and stored. For example, it may be determined by the image capture device if a maximum video length has been reached or an input is received signaling the end of video capture. If at the block 630, the image capture device determines that there are additional frames of video to be captured and stored, the process proceeds to the block 610. Otherwise, the process 600 ends.

It should be noted, that during the process 600, each of the plurality of cropped images stored as part of the video may maintain a constant field of view due to the determination made at block 615.

Figure 7:
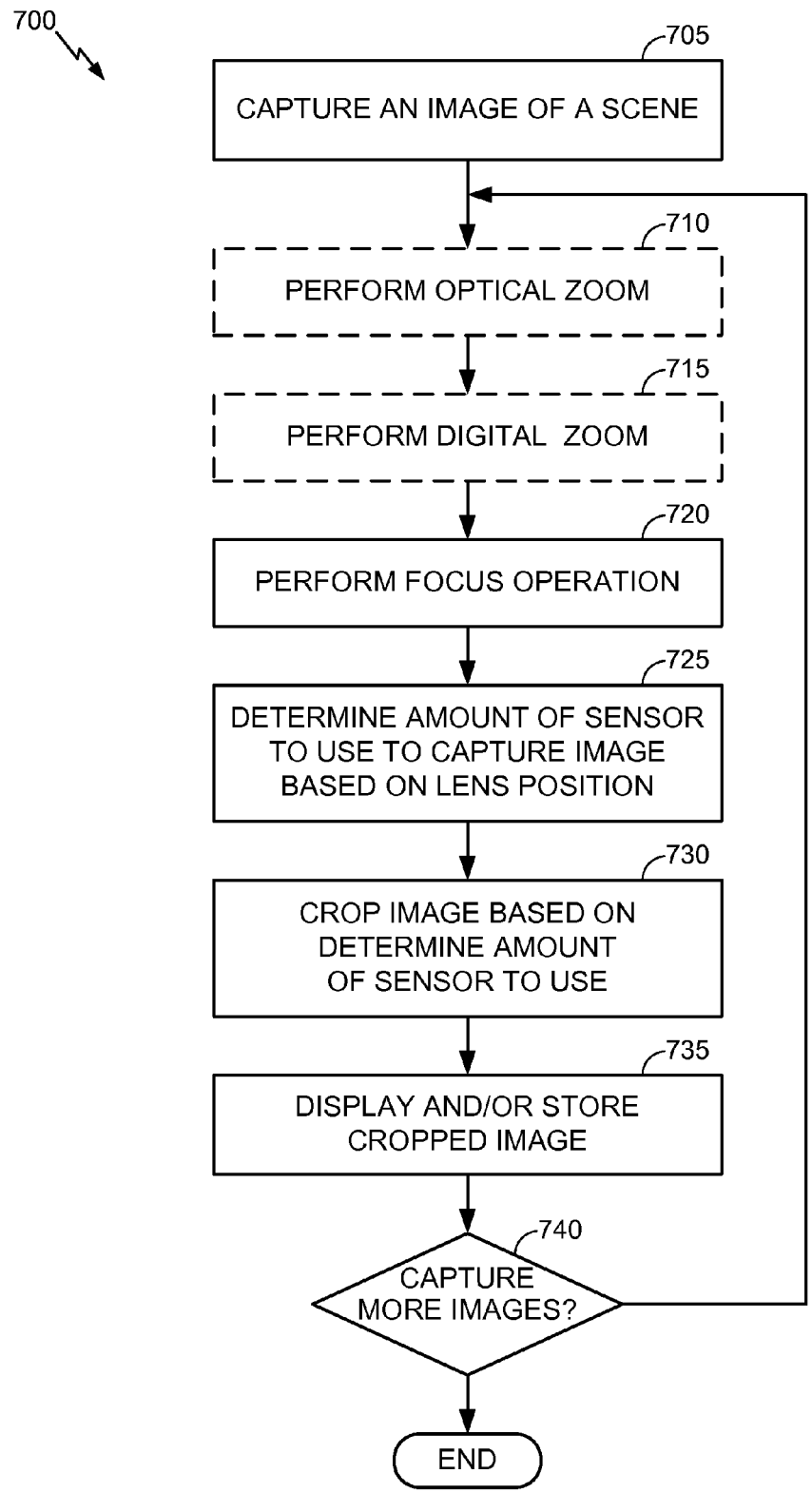
FIG. 7 is a flowchart of a process for maintaining a constant field of view for an image being captured by an image capture device with an optical and/or digital zoom feature.

FIG. 7 is a flowchart of a process 700 for maintaining a constant field of view for an image being captured by an image capture device with an optical and/or digital zoom feature. At a block 705, an image capture device begins capturing an image of a scene to take a picture of the scene, record video of the scene, and/or preview in the display the scene in a preview mode. Further, at an optional block 710, an optical zoom operation may be performed by the image capture device, causing a lens of the image capture device to move to a particular distance from an image sensor of the image capture device.

Continuing, at an optional block 715, a digital zoom operation may be performed by the image capture device, causing a change in only a portion of the image sensor to be used to capture an image.

Further, at a block 720, a focus operation (e.g., autofocus or manual focus) may be performed by the image capture device to focus on one or more objects in the scene. The focus operation may cause a lens of the image capture device to shift or move to a certain distance from an image sensor of the image capture device.

At a block 725, the image capture device may determine a portion of the image sensor to use for storing one or more images and/or displaying a preview of the scene on a display of the image capture device. The image capture device may determine the portion of the image sensor to use based on the distance of the lens from the image sensor, and also based on the position of the lens due to an optical zoom operation if performed and/or the portion of the image sensor used due to a digital zoom operation if performed, to maintain a constant field of view of the scene. For example, the image capture device may calculate the portion of the image sensor to use based on a formula, such as formula (1), and the techniques described for calculating the portion based on zoom operations.

Alternatively, the image capture device may use a look up table stored in a memory of the image capture device to look up the portion of the image sensor to use based on the distance of the lens from the image sensor and also based on the position of the lens due to an optical zoom operation if performed and/or the portion of the image sensor used due to a digital zoom operation if performed. In particular, the look up table may comprise a database of entries of distances between the lens and the image sensor and corresponding portions of the image sensor to use for each lens position based on optical zoom, portion of the image sensor used based on digital zoom, and/or a focus operation performed.

Continuing, at a block 730, the image capture device may crop the full resolution image being captured by the image sensor according to the determined portion of the image sensor to use. At a block 735, the image capture device may display the cropped image on the display of the image capture device, store the cropped image as a single image, store the cropped image as a frame of video, and/or store the full resolution image as a single image.

Further, at a block 740, it may be determined if the image capture device is still being used to take a picture of scene, take a video of the scene, and/or preview the scene in a preview mode. If at the block 740, the image capture device determines that the image capture device is still being used to take a picture of the scene, take a video of the scene, and/or preview the scene in a preview mode, the process proceeds to the block 710. Otherwise, the process 700 ends.

It should be noted, that during the process 700, each of the cropped images from the block 730 may maintain a constant field of view due to the determination made at block 725.

Figure 8:
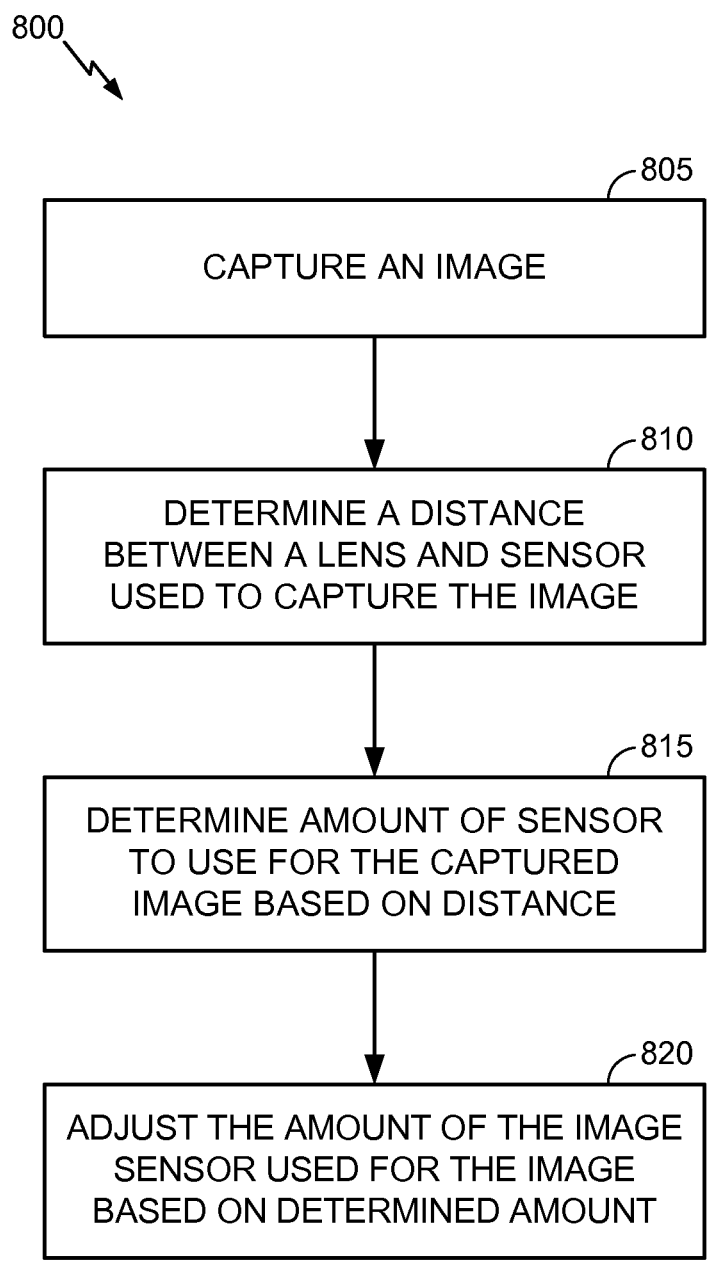
FIG. 8 is a flowchart of another process for maintaining a constant field of view for an image being captured by an image capture device.

FIG. 8 is a flowchart of another process 800 for maintaining a constant field of view for an image being captured by an image capture device. At a block 805, an image capture device captures an image. Further, at a block 810, the image capture device determines a distance between a lens and an image sensor of the image capture device used to capture the image. The distance may vary based on a focus operation performed by the image capture device that changes the lens position.

Continuing, at a block 815, the image capture device may determine a portion of the image sensor to use for the image in order to maintain a constant field of view for one or more images including the image captured by the image capture device. The image capture device may determine the portion of the image sensor to use based on the distance of the lens from the image sensor, and also based on the position of the lens due to an optical zoom operation if performed and/or the portion of the image sensor used due to a digital zoom operation if performed, to maintain a constant field of view of the scene. For example, the image capture device may calculate the portion of the image sensor to use based on a formula, such as formula (1), and the techniques described for calculating the portion based on zoom operations.

Alternatively, the image capture device may use a look up table stored in a memory of the image capture device to look up the portion of the image sensor to use based on the distance of the lens from the image sensor and also based on the position of the lens due to an optical zoom operation if performed and/or the portion of the image sensor used due to a digital zoom operation if performed. In particular, the look up table may comprise a set of database of entries including pairs of distances between the lens and the image sensor and corresponding portions of the image sensor to use for each lens position based on optical zoom, portion of the image sensor used based on digital zoom, and/or combinations of the two.

Continuing, at a block 820, the image capture device may adjust the portion of the image sensor used for the image (e.g., crop the image) based on the determined portion of the image sensor. Further, a plurality of images may be each captured by the image capture device and similarly adjusted to maintain a constant field of view between the plurality of images. The adjusted image(s) may be stored and/or displayed on a display of the image capture device in a preview mode.

It should be noted that any and all of the processes 500-800 are examples of processes that may be performed. One of skill in the art will understand that other similar processes may also be performed according to the teachings herein. For example, one or more blocks of the processes 500-800 may be added, removed, and/or changed in the order performed.

Any and all of the processes 500-800 may be performed by an image capture device, such as any of the image capture devices 100, 300, and 400 described herein. In some embodiments, the processes 500-800 may be performed by hardware and/or software on an image capture device. For example, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, digital cameras, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodied in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera Likewise, the destination device may interface with an external display device, rather than including an integrated display device.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

The invention claimed is:

1. A method for capturing images, the method comprising:
capturing a plurality of images with an image capture device, the plurality of images comprising a first image;
determining a distance between a lens and an image sensor of the image capture device for capturing the first image;
determining a portion of the image sensor to use for the first image based on the determined distance in order to maintain a constant field of view for the plurality of images captured by the image capture device;
adjusting the portion of the image sensor used for the first image to generate an adjusted first image and to maintain the constant field of view for the plurality of images, wherein the adjusting is based on the determined portion of the image sensor;
storing the first image when a single image is selected for storage, wherein the first image is a full resolution image; and
storing the adjusted first image when multiple images are selected for storage, wherein the adjusted first image comprises a cropped image of the full resolution image.

2. The method of claim 1, further comprising:
displaying the plurality of images in an image preview mode on a display of the image capture device so as to maintain the constant field of view for the plurality of images.

3. The method of claim 1, wherein the distance between the lens and the image sensor is based on a focus operation.

4. The method of claim 3, further comprising determining an optical zoom position for the lens, wherein the distance between the lens and the sensor is further based on the optical zoom position for the lens, and wherein determining the portion of the image sensor to use for the first image is further based on the optical zoom position for the lens.

5. The method of claim 3, further comprising determining a digital zoom amount for capturing the first image, wherein determining the portion of the image sensor to use for the first image is further based on the digital zoom amount.

6. The method of claim 1, wherein the portion is determined based on a formula correlating the distance between the lens and the image sensor and the portion of the image sensor to use to maintain the constant field of view.

7. The method of claim 1, wherein the portion is determined based on a look up table correlating the distance between the lens and the image sensor to the portion of the image sensor to use to maintain the constant field of view.

8. The method of claim 1, further comprising displaying the adjusted first image in an image preview mode on a display of the image capture device.

9. The method of claim 1, wherein adjusting the portion of the image sensor used for the first image to generate the adjusted first image comprises adjusting the portion of the captured first image used to generate the adjusted first image.

10. An image capture device comprising:
a memory; and
a processor configured to:
capture a plurality of images, the plurality of images comprising a first image;

determine a distance between a lens and an image sensor of the image capture device for capturing the first image;

determine a portion of the image sensor to use for the first image based on the determined distance in order to maintain a constant field of view for the plurality of images captured by the image capture device;

adjust the portion of the image sensor used for the first image to generate an adjusted first image to maintain the constant field of view for the plurality of images, wherein the adjusting is based on the determined portion of the image sensor;

store the first image when a single image is selected for storage, wherein the first image is a full resolution image; and store the adjusted first image when multiple images are selected for storage, wherein the adjusted first image comprises a cropped image of the full resolution image.

11. The image capture device of claim 10, wherein the processor is further configured to:

display the plurality of images in an image preview mode on a display of the image capture device so as to maintain the constant field of view for the plurality of images.

12. The image capture device of claim 10, wherein the distance between the lens and the image sensor is based on a focus operation.

13. The image capture device of claim 12, wherein the processor is further configured to determine an optical zoom position for the lens, wherein the distance between the lens and the sensor is further based on the optical zoom position for the lens, and wherein to determine the portion of the image sensor to use for the first image is further based on the optical zoom position for the lens.

14. The image capture device of claim 12, wherein the processor is further configured to determine a digital zoom amount for capturing the first image, wherein to determine the portion of the image sensor to use for the first image is further based on the digital zoom amount.

15. The image capture device of claim 10, wherein the portion is determined based on a formula correlating the distance between the lens and the image sensor and the portion of the image sensor to use to maintain the constant field of view.

16. The image capture device of claim 10, wherein the portion is determined based on a look up table correlating the distance between the lens and the image sensor to the portion of the image sensor to use to maintain the constant field of view.

17. The image capture device of claim 10, wherein the processor is further configured to display the adjusted first image in an image preview mode on a display of the image capture device.

18. The image capture device of claim 10, wherein to adjust the portion of the image sensor used for the first image to generate the adjusted first image comprises to adjust the portion of the captured first image used to generate the adjusted first image.

19. An image capture device comprising:

means for capturing a plurality of images, the plurality of images comprising a first image;

means for determining a distance between a lens and an image sensor of the image capture device for capturing the first image;

means for determining a portion of the image sensor to use for the first image based on the determined distance in order to maintain a constant field of view for the plurality of images captured by the image capture device;

means for adjusting the portion of the image sensor used for the first image to generate an adjusted first image and to maintain the constant field of view for the plurality of images, wherein the adjusting is based on the determined portion of the image sensor;

means for storing the first image when a single image is selected for storage, wherein the first image is a full resolution image; and means for storing the adjusted first image when multiple images are selected for storage, wherein the adjusted first image comprises a cropped image of the full resolution image.

20. The image capture device of claim 19, further comprising:

means for displaying the plurality of images in an image preview mode on a display of the image capture device so as to maintain the constant field of view for the plurality of images.

21. The image capture device of claim 19, wherein the portion is determined based on a formula correlating the distance between the lens and the image sensor and the portion of the image sensor to use to maintain the constant field of view.

22. The image capture device of claim 19, further comprising means for displaying the adjusted first image in an image preview mode on a display of the image capture device.

23. A non-transitory computer readable medium having stored thereon instructions that, when executed, cause a processor of an image capture device to perform a method for capturing images, the method comprising:

capturing a plurality of images, the plurality of images comprising a first image;

determining a distance between a lens and an image sensor of the image capture device for capturing the first image;

determining a portion of the image sensor to use for the first image based on the determined distance in order to maintain a constant field of view for the plurality of images captured by the image capture device;

adjusting the portion of the image sensor used for the first image to generate an adjusted first image and to maintain the constant field of view for the plurality of images, wherein the adjusting is based on the determined portion of the image sensor;

storing the first image when a single image is selected for storage, wherein the first image is a full resolution image; and storing the adjusted first image when multiple images are selected for storage, wherein the adjusted first image comprises a cropped image of the full resolution image.

24. The computer readable medium of claim 23, wherein the method further comprises:

displaying the plurality of images in an image preview mode on a display of the image capture device so as to maintain the constant field of view for the plurality of images.

25. The computer readable medium of claim 23, wherein the portion is determined based on a formula correlating the distance between the lens and the image sensor and the portion of the image sensor to use to maintain the constant field of view.

26. The computer readable medium of claim 23, wherein the method further comprises displaying the adjusted first image in an image preview mode on a display of the image capture device.

* * * * *